United States Patent [19]
Martin et al.

[11] Patent Number: 5,169,123
[45] Date of Patent: Dec. 8, 1992

[54] STEEL BALL VALVE

[75] Inventors: Roger Martin, Saint-Cyr; Laurent Buffa, Serrieres, both of France

[73] Assignee: Vanatome, Societe Anonyme, Annonay, France

[21] Appl. No.: 810,356

[22] Filed: Dec. 18, 1991

Related U.S. Application Data

[63] Continuation of Ser. No. 515,752, Apr. 30, 1990, abandoned.

[30] Foreign Application Priority Data

Apr. 28, 1989 [FR] France .................. 89 06017

[51] Int. Cl.⁵ ................................ F16K 5/20
[52] U.S. Cl. ....................... 251/172; 251/160
[58] Field of Search ...................... 251/172, 160

[56] References Cited

U.S. PATENT DOCUMENTS

| | | | |
|---|---|---|---|
| 3,912,220 | 10/1975 | Vasicek et al. | 251/172 X |
| 4,195,655 | 4/1980 | Augrburger et al. | 251/172 X |
| 4,562,992 | 1/1986 | Sugisaki et al. | 251/172 X |
| 4,575,045 | 3/1986 | Martin . | |

FOREIGN PATENT DOCUMENTS

| | | | |
|---|---|---|---|
| 600457 | 6/1960 | Canada | 251/172 |
| 2131643 | 1/1973 | Fed. Rep. of Germany | 251/172 |
| 2208453 | 9/1973 | Fed. Rep. of Germany | 251/172 |
| 46595 | 1/1927 | Norway | 251/172 |

Primary Examiner—John C. Fox
Attorney, Agent, or Firm—Browdy and Neimark

[57] ABSTRACT

A valve, with a ball having a shaft (5), comprises, at least on the "upstream" side, a seat (14) that can move in the direction in which the fluid flows (F). Seat (14) is connected to body (1) of the valve by an annular membrane (21), constituting a wall of an annular chamber (22) relatively isolated from the "upstream" conditions for example, by a calibrated hole (23). Equilibration means (26) are provided, with a channel (28) and a conduit (29) connecting annular chamber (22) to central volume (27) of the valve, a communication being formed when the valve is opened, thus moving seat (14) away from ball (5). Said communication can be caused to form by control rod (10) of ball (5) when the valve is adjusted for opening.

13 Claims, 2 Drawing Sheets

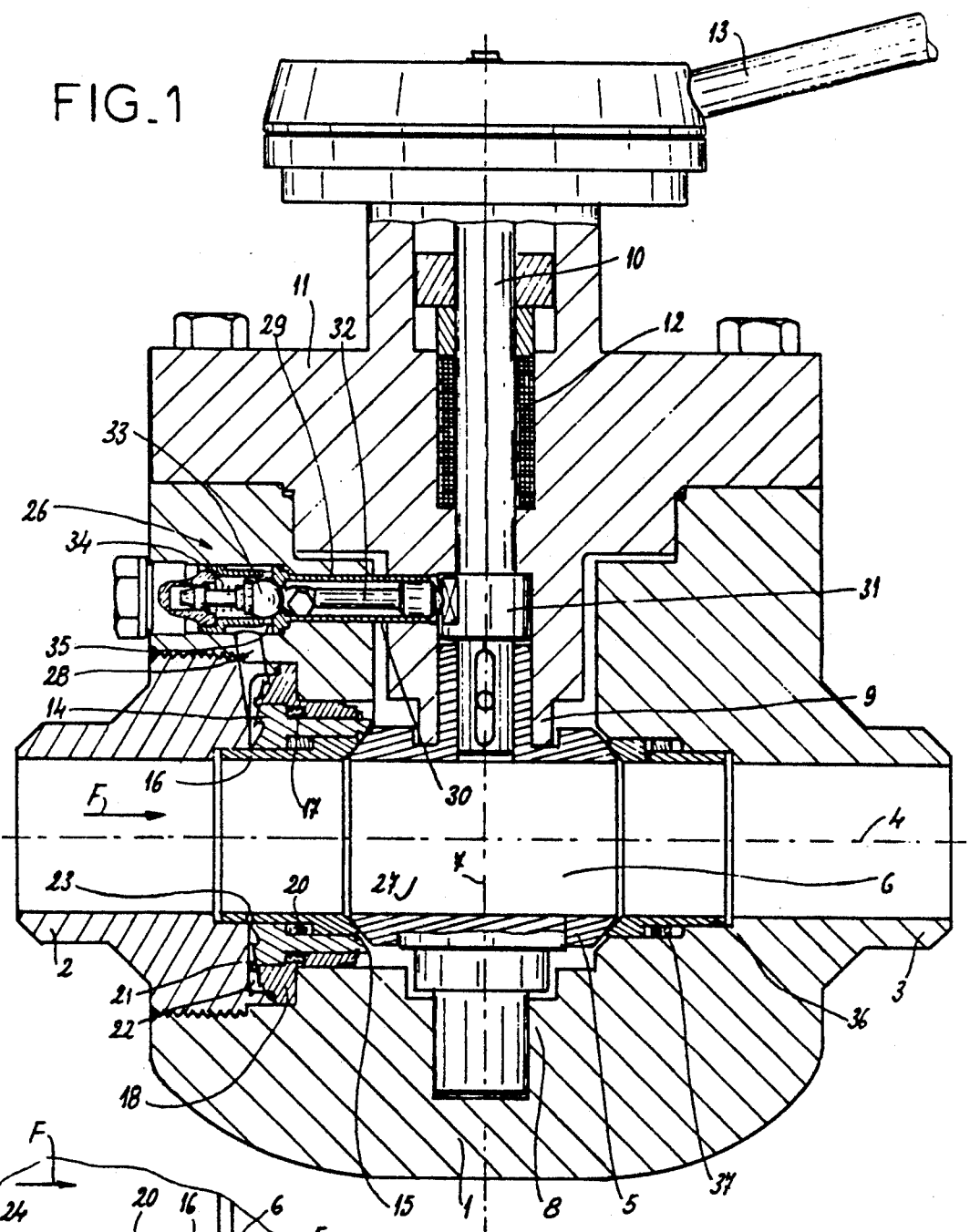

5,169,123

STEEL BALL VALVE

This application is a continuation of application Ser. No. 515,752, filed Apr. 30, 1990, now abandoned.

FIELD OF THE INVENTION

This invention pertains to a steel ball valve of the type having a shaft, wherein a closure or ball mounted inside the body of the valve and comprising a central passage is guided in rotation in bearings and is connected to control means designed to cause it to pivot around an axis between a closed position and an open position wherein a fluid can flow following the direction of an axis perpendicular to the rotation axis of the ball, through the central passage of said ball.

More specifically, the invention pertains to a steel ball valve meeting the general definition reviewed above and comprising at least on the "upstream" side (with reference to the direction in which the fluid is flowing), a seat mounted to move in the direction of the axis according to which said flow occurs, the seat being connected to the body of the valve by an annular membrane, and means being provided to ensure the equilibration of the pressure of the fluid on both sides of said seat before the valve is opened.

BACKGROUND OF THE INVENTION

Such a steel ball valve, adapted to uses under high pressures and at high temperatures, is described in French Patent No. 84 08177/2 564 558 or in the corresponding European Patent No. 0 165 186, in the name of the applicant. Through the use of metal membranes, or equivalent means such as bellows sections, and of equilibration means, this type of valve makes it possible to release the seat on the "upstream" side when the valve is opened, so that said seat is no longer pressed against the ball. In this case, the ball can rotate easily, without friction, and the valve can easily be adjusted to the open position with no risk of jamming.

Moreover, in closed position, the difference in pressure between the upstream and downstream parts of the valve and exerted on the metal membrane causes the seat to be pressed against the ball and thus ensures the seal of the valve in the upstreamdownstream sense, the seat being endowed with an annular sealing lip at its end closest to the ball.

SUMMARY OF THE INVENTION

It is the primary object of this invention to provide an improved valve of the type described above, for the purpose of improving its performance further to obtain a more effective seal in closed position, a decrease in the torque to be exerted to adjust it, and a reduction in wear and tear.

It is a further object of this invention to provide a steel ball valve as described above and wherein the equilibration means comprise at least on the "upstream" side an annular chamber, one wall of which is composed of the aforementioned annular membrane and which is relatively isolated from the "upstream" conditions, and means for forming the temporary communication between the annular chamber and the central volume of the valve, which houses the ball.

Said annular chamber makes it possible to maintain a diference in pressure of zero on the membrane when the valve is adjusted for opening or closing, regardless of the geometry of the downstream seat. Through the use of means to form the communication with the central volume, and preferably of at least one spring acting on the upstream seat, in the sense of pushing it away from the ball, said seat is caused to disappear or to retract automatically when the opening movement is initiated, and before the ball pivots.

A scraper joint mounted inside the seat can be held in contact with the ball, regardless of the position of said seat, as the result of the thrust of at least one other spring acting in the opposite direction of the aforementioned spring.

The aforementioned annular chamber can be relatively isolated from the "upstream" conditions either by at least one calibrated hole placed radially in the scraper joint, or by a radial clearance provided between said scraper joint and the body of the valve. The volume of the chamber in question is also relatively small, which makes it possible to equilibrate pressure virtually instantaneously with the central volume when said two volumes are placed in communication, the relative isolation of the annular chamber from the "upstream" conditions allowing pressures and variations in the pressure of the central volume to extend to said annular chamber. In this way, a perfect balance of the pressures is obtained between the two volumes considered, thus a difference in pressure of zero on the membrane despite the variations in pressure that may exist in the central volume during transient states.

On the other hand, when the valve is closed, the calibrated hole or equivalent clearance ensures that the pressure of the chamber in question is maintained, which causes the seat to be applied to the closure by means of its sealing lip, overcoming the force of the spring(s) pushing said seat away.

Moreover, the relative isolation of said chamber makes it possible to protect it from turbulence, and prevents impurities from circulating or remaining therein.

According to a preferred embodiment, the means for forming the communication between the annular chamber and the central volume comprise at least one internal channel and/or conduit, with a closure activated directly by the ball control means, when opening is initiated and when closing is completed. In this way, a particularly simple and compact means of equilibration is created since said means are perfectly integrated into the valve, not only in their construction, but furthermore and especially in their control, which is triggered automatically when the valve is adjusted.

According to a particular embodiment, the control rod of the ball comprises a cam that cooperates with a tappet, which itself acts on a mobile closure, for example, in the form of a pin subjected to the effects of a spring, inserted in the channel and/or conduit forming the communication between the annular chamber and the central volume. The tappet can be mounted to slide in a tubular conduit issuing into the central volume through at least one orifice and communicating through at least one hole designed to be blocked or unblocked by the closure, with a channel issuing into the annular chamber.

In the case of a two-directional valve, the "upstream" seat and the "downstream" seat are each mounted to move in the direction of the axis along which the fluid flows, each seat being associated with a membrane and with an annular chamber relatively isolated from the "upstream" and "downstream" conditions, depending on the case, and means to form the communication between the central volume of the valve and both of the annular chambers, said communication being formed selectively.

In such a perfectly symmetrical embodiment, each of the two "upstream" and "downstream" seats is preferably endowed, in addition to the aforementioned membrane, with a counter-membrane which intervenes during the equilibration phases to protect the membrane associated with the seat on the "downstream" side from the effect of inverse pressure, which a single membrane could not withstand.

BRIEF DESCRIPTION OF THE DRAWINGS

In any event, the invention will be more clearly understood with the aid of the description below, in reference to the attached schematic drawing, showing a few embodiments of this steel ball valve as a non-restrictive example:

FIG. 1 is a longitudinal cut of a valve according to the invention, shown in an open position;

FIG. 2 is a enlarged-scale view of a detail of FIG. 1, showing a variation;

DETAILED DESCRIPTION OF THE PREFERRED EMBODIMENTS

Figure 3:
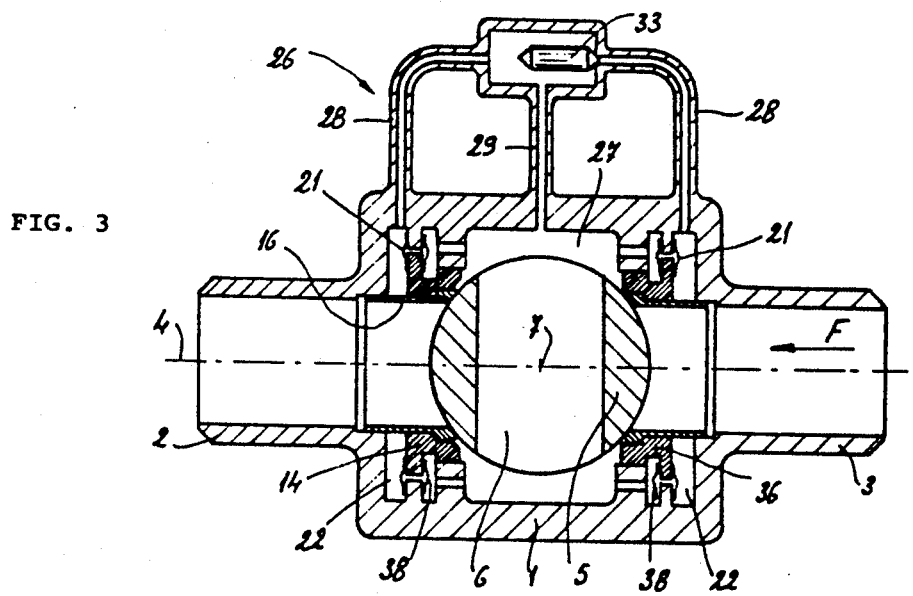
FIG. 3 is a schematic cut view of another valve according to the invention, in a closed position.

The valve shown in FIGS. 1 and 2 comprises a body 1, whose two ends form annular flanges 2 and designed to be connected to outside tubulures serving to transport a fluid flowing in the direction of an axis 4. Inside body 1 is placed a closure or ball 5 comprising a central passage 6 having a circular section corresponding to the section of the fluid flowing along axis 4. Ball 5 of the type having a shaft is mounted to pivot around an axis 7 perpendicular to the aforementioned axis 4 in bearings 8 and 9. Ball 5 is activated through the intermediary of a control rod 10 mounted to turn according to axis 7 and passing through a closing component 11 with the insertion of seals 12, control rod 10 itself being activated through the use of an outside operating handle 13.

The fluid flows along axis 4 in the direction indicated by Arrow F; with respect to ball 5, we can distinguish an "upstream" side, where a seat 14 is placed, said seat being mounted to move in the direction of axis 4. At its end located beside ball 5, seat 14 comprises an annular lip 15 designed to press against said closure 5, while a scraper joint 16 in the form of an elongated ring is mounted inside seat 14. As shown in FIG. 2, scraper joint 16 is designed to maintain contact and be sealed against ball 5 during the entire operation of the valve, whether opening or closing, by the pressure of springs 20.

Seat 14 is subjected to the permanent thrust of springs 17, which are supported by an annular component 18 solidary with body 1 and which tend to move said seat 14 away from ball 5, up to a rear stop placed in 19. Moreover, said scraper joint 16 is sealingly maintained in contact with ball 5 as the result of the thrust of other springs 20, which are supported by a collar of seat 14.

An annular metal membrane 21 is welded on the one hand to the rear surface of seat 14, and, on the other hand to the rear surface of fixed annular piece 18. With the components to which it is welded and with body 1, membrane 21 delimits an annular "upstream" chamber 22. Said chamber 22 is relatively isolated from "upstream" conditions, with a limited communication provided either by a calibrated hole 23 placed radially in scraper joint 16 (see FIG. 1) or, as a variation, by radial clearance 24 placed between said scraper joint 16 and body 1 (see FIG. 2).

The valve further comprises means 26 for forming the communication between chamber 22 and the central part of body 1 and more particularly with the central volume 27 accommodating ball 5. In the example embodiment in FIG. 1, said means for forming the communication 26 comprise a channel 28 placed in body 1 from chamber 22, in a substantially radial direction, and a tubular conduit 29 parallel to axis 4, with orifices 30 opened towards central volume 27.

Control rod 10 comprises a cam 31, which cooperates with a tappet 32 mounted to slide axially in tubular conduit 29 and itself acting on a pin 33 subjected to the effects of a spring 34. Pin 33 constitutes a closure making it possible to block or unblock holes 35 placed in the wall of tubular conduit 29 and designed to provide a communication between the latter and channel 28.

When, using operating handle 13, control rod 10 is caused to turn in the opening direction, the means for forming the communication 26 described above is first activated, ball 5 not pivoting immediately because of the clearance. In this case, cam 31 displaces tappet 32 which itself pushes pin 33 back against the action of spring 34 so that holes 35 are unblocked. In this way, in a practically instantaneous manner, an equilibration of the pressures between "upstream" chamber 22 and central volume 27 is obtained.

Next, this equilibration phase being completed, continued rotation of control rod 10 causes the ball 5 to be pulled in rotation around axis 7 to an open position shown in FIG. 1, with the communication between chamber 22 and volume 27 being maintained during the entire valve opening movement.

As soon as said communication is formed, the difference in pressure exerted on membrane 21 is eliminated and seat 14 moves away from closure 5, thus allowing the latter to rotate freely without friction.

When control rod 10 is moved in the closing direction, we first of all recover the clearance and then pull ball 5 in rotation around axis 7, with means 26 still maintaining the communication between chamber 22 and volume 27. When ball 5 reaches the completely closed position, and simultaneously with the end of the rotation of control rod 10 and cam 31, pin 33 blocks holes 35, and the communication between chamber 22 and volume 27 is interrupted. The difference in pressure to which membrane 21 is then subjected causes seat 14 to return against ball 5. In the embodiment in FIGS. 1 and 2 described to this point, the valve is designed to be used with fluid flowing in only one direction, indicated by Arrow F. On the "downstream" side of said valve, the structure is thus simplified and comprises only an annular seat 36 pushed towards ball 5 by springs 37. The constant of spring 37 is designed so to permit annular seat 36 to open due to the pressure of the fluid in volume 27 on seat 36 when valve 33 is being closed. This, of course, relieves the equilibrium created on both sides of seat 14 when valve 33 is being open.

On the contrary, FIGS. 3 to 7 more schematically represent another form of embodiment of the valve according to the invention, that can be used for both directions of fluid flow.

In said "two-directional" valve, "upstream" seat 36 is identical to "downstream" seat 14, the structure being symmetrical with respect to axis 7 of the control rod, and the principle remains the same as described above, especially for the formation of an annular chamber 22 associated with each seat 14 or 36 and relatively isolated by a clearance or calibrated hole from the "upstream" and "downstream" pressure conditions, depending on the case.

Each seat 14 or 36 in this case is associated with a double membrane making it possible to use the valve in both flow directions, having, as shown in the drawing, on the one hand, a membrane 21 equivalent to the one described above, thus located beside chamber 22, and, on the other hand, a counter-membrane 38 turned towards the central part of the valve, whose function will be presented below.

The means 26 to form the communication are also symmetrical, having channels or conduits 28 and 29 making it possible to form the communication selectively between central volume 27 and chamber 22 associated with either of the two seats 14 and 36. A mobile two-position closure pin 33 that can be activated directly using the control rod of the valve establishes or interrupts the communication between central volume 27 and either of the two chambers 22.

Figure 4:
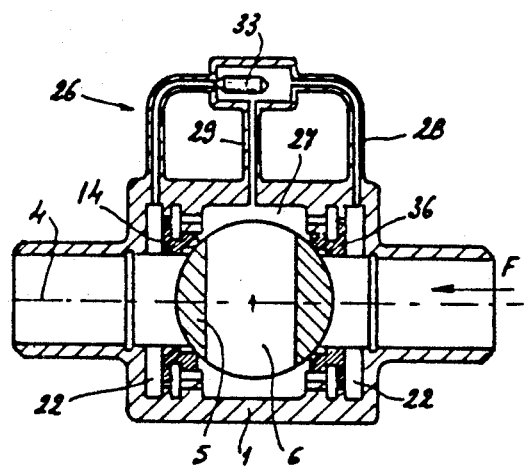
FIGS. 4 to 7 are views similar to FIG. 3 illustrating various phases in the operation of said valve.
Figure 5:
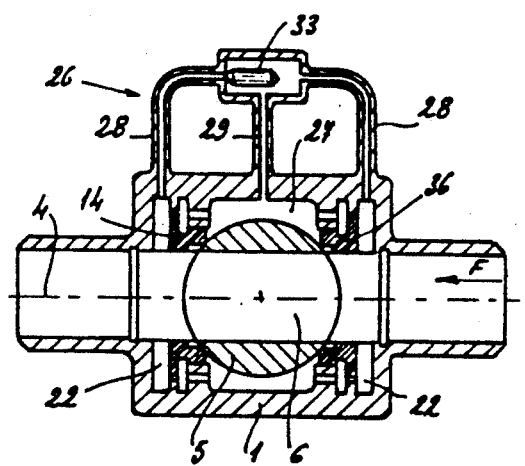
Figure 6:
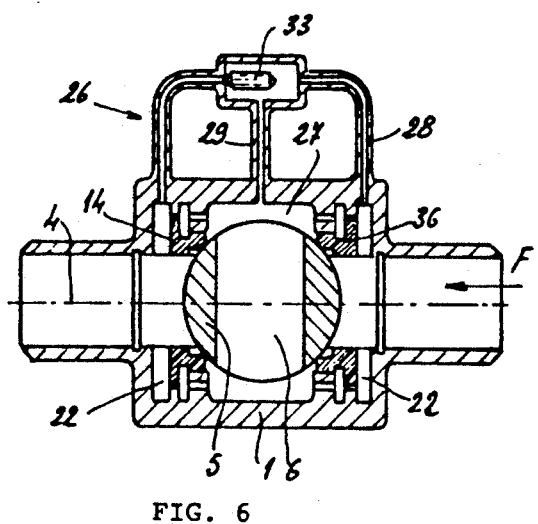
Figure 7:
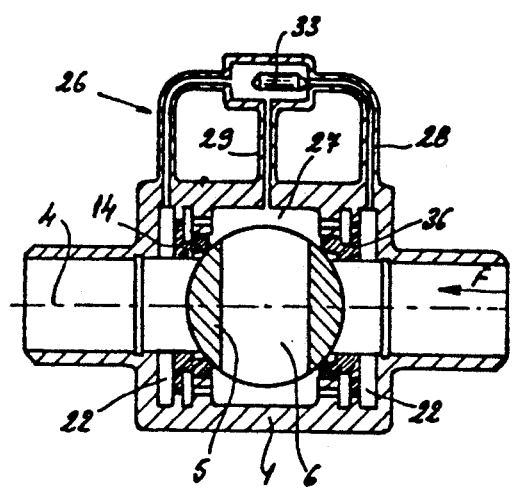

FIG. 3 shows said valve in closed position with closure 33 interrupting the communication between central volume 27 and chamber 22 located on the "upstream" side (with reference to the direction F in which the fluid is flowing in the use under consideration). FIG. 4 illustrates the first opening phase of the valve, with displacement of closure 33 placing central volume 27 in communication with "upstream" chamber 22. FIG. 5 shows the open valve. FIG. 6 illustrates the valve in the process of closing, and finally, FIG. 7 shows the valve when closing is completed, when closure 33 has returned to the position in which the communication previously established between central volume 27 and "upstream" chamber 22 is interrupted.

We note that counter-membranes 38 protect membranes 21, on the "downstream" side in the use under consideration, from the effect of the inverse pressure prevailing momentarily inside body 1 during the phases of equilibration (FIG. 4) or closing (FIG. 6).

Of course, the invention is not limited solely to the embodiments of said steel ball valve described above as non-restrictive examples; on the contrary, it encompasses all variations of embodiments and applications following the same principle. In particular, it would not depart from the framework of the invention by modifying the details of the means to form the communication between the central volume and the annular chamber(s), or by replacing said "integrated" means with an outside equilibration device performing the same function.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A steel ball valve of the type having a shaft, wherein a ball (5) is mounted inside a body (1) of the valve and comprises a central passage (6) and is guided in rotation in bearings (8, 9) and is connected to control means (10 to 13) designed to cause it to pivot around an axis (7) between a closed position and an open position wherein the fluid can flow in the direction of an axis (4) perpendicular to the rotation axis (7) of the ball (5), through the central passage (6) in said ball (5), said valve comprising at least on an upstream side with reference to the direction (F) in which the fluid is flowing, a seat (14) mounted to move in the direction of the axis (4) along which said flow occurs, said seat (14) being connected to the body (1) of the valve by an annular membrane (21) and first means for assuring equilibration of pressure of the fluid on both sides of said seat (14) when the valve is being opened and second means (36) for relieving the equilibration when the valve is being closed, wherein said first equilibration means comprise at least on the upstream side an annular chamber (22) one wall of which is composed of the aforementioned annular membrane (21) and which is relatively isolated (23, 24) from the upstream conditions, and means (26) for forming a temporary communication between said annular chamber (22) and a central volume (27d) of the valve, which houses said ball (5), wherein said valve is provided with at least one first spring (17) acting on said seat (14) to move it away from said ball (5);

wherein a scraper joint (16) is mounted inside said seat (14) and is kept in contact with said ball (5) regardless of the position of said seat (14) under the effect of the thrust of at least one second spring (20) acting in an opposite direction of said first spring (17).

2. The steel ball alve according to claim 1, wherein said annular chamber (22) is relatively isolated from the upstream conditions by at least one calibrated hole (23) placed radially in said scraper joint (16).

3. The steel ball valve according to claim 1, wherein said annular chamber (22) is relatively isolated from the upstream conditions by a radial clearance (24) provided between said scraper joint (16) and said body (1) of the valve.

4. The steel ball valve according to claim 1, wherein said annular chamber (22) has a relatively small volume.

5. The steel ball valve according claim 1, wherein said upstream seat (14) and a downstream seat (36) are each mounted to move in the direction of the axis (4) along which the fluid flows, wherein each seat (14, 36) is associated with a membrane (21) and with an annular chamber (22) that is relatively isolated from the upstream and downstream conditions, depending on the case, and wherein said means of forming the communication (26) connects the central volume (27) of the valve with both of the annular chambers (22), said communication being formed selectively.

6. The steel ball valve according to claim 5, wherein each of the upstream (14) and downstream (36) seats are equipped with a counter-membrane (38) in addition to the aforementioned membrane (21).

7. A steel ball valve of the type having a shaft, wherein a ball (5) is mounted inside a body (1) of the valve and comprises a central passage (6) and is guided in rotation in bearings (8, 9) and is connected to control means (10 to 13) designed to cause it to pivot around an axis (7) between a closed position and an open position wherein the fluid can flow in the direction of an axis (4) perpendicular to the rotation axis (7) of the ball (5), through the central passage (6) in said ball (5), said valve comprising at least on an upstream side with reference to the direction (F) in which the fluid is flowing, a seat (14) mounted to move in the direction of the axis (4) along which said flow occurs, said seat (14) being connected to the body (1) of the valve by an annular membrane (21) and first means for assuring equilibration of pressure of the fluid on both sides of said seat (14) when the valve is being opened and second means (36) for relieving the equilibration when the valve is being closed, wherein said first equilibration means comprise at least on the upstream side an annular chamber (22) one wall of which is composed of the aforementioned annular membrane (21) and which is relatively isolated (23, 24) from the upstream conditions, and means (26) for forming a temporary communication between said annular chamber (22) and a central volume (27d) of the valve, which houses said ball (5);

wherein said means (26) for forming the communication between said annular chamber (22) and said central volume (27) comprise at least one internal channel (28) and/or one conduit (29), with a closure (33) activated directly by the control means (10 to 13, 31) of said ball (5), when opening is initiated and when closing is completed.

8. The steel ball valve according to claim 7, wherein said control rod (1) of said ball (5) comprises a cam (31) that cooperates with a tappet (32) which itself acts on a mobile closure (33).

9. The steel ball valve according to claim 8, wherein aid mobile closure (33) is in the form of a pin subjected to the effect of a spring (34) inserted in channel (28) and/or conduit (29) forming the communication between said annular chamber (22) and said central volume (27).

10. The steel ball valve according to claim 9, wherein said tappet (32) is mounted to slide in a tubular conduit (29) issuing into said central volume (27) through at least one orifice (30) and communicating through at least one hole (35) designed to be blocked or unblocked by said mobile closure (33, with said channel (28) issuing into said annular chamber (22).

11. The steel ball valve according to claim 7, wherein said annular chamber (22) is relatively isolated from the upstream conditions by at least one calibrated hole (23) placed radially in said scraper joint (16).

12. The steel ball valve according to claim 7, wherein said annular chamber (22) is relatively isolated from the upstream conditions by a radial clearance (24) provided between said scraper joint (16) and said body (1) of the valve.

13. The steel ball valve according to claim 7, wherein said annular chamber (22) has a relatively small volume.

* * * * *